United States Patent
Kitahara et al.

(10) Patent No.: US 8,792,416 B2
(45) Date of Patent: Jul. 29, 2014

(54) MOBILE COMMUNICATION SYSTEM, MOBILE COMMUNICATION METHOD, DISTRIBUTION SERVER, RADIO NETWORK CONTROLLER AND MOBILE STATION

(75) Inventors: Ryo Kitahara, Yokohama (JP); Katsuhiro Noguchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1250 days.

(21) Appl. No.: 12/305,549

(22) PCT Filed: Jun. 19, 2007

(86) PCT No.: PCT/JP2007/062346
§ 371 (c)(1),
(2), (4) Date: Jun. 26, 2009

(87) PCT Pub. No.: WO2007/148701
PCT Pub. Date: Dec. 27, 2007

(65) Prior Publication Data
US 2009/0296633 A1    Dec. 3, 2009

(30) Foreign Application Priority Data
Jun. 19, 2006  (JP) ............... P2006-169435

(51) Int. Cl.
*H04L 9/32* (2006.01)
*H04L 9/30* (2006.01)
*H04L 9/00* (2006.01)

(52) U.S. Cl.
CPC ............ *H04L 9/3244* (2013.01); *H04L 9/3247* (2013.01); *H04L 9/30* (2013.01); *H04L 9/006* (2013.01)
USPC ........ 370/328; 455/404.1; 455/410; 455/521; 713/153; 713/155; 713/171; 713/176; 726/4; 726/17; 726/21; 726/30; 380/247; 380/270; 380/282; 380/285; 380/30

(58) Field of Classification Search
USPC ............ 370/310.2, 328–339, 349; 455/404.1, 455/404.2, 410, 411, 422.1, 521; 713/153, 713/155, 171, 176; 726/4, 17, 21, 30; 380/247, 270, 282, 285, 30
See application file for complete search history.

(56) References Cited

U.S. PATENT DOCUMENTS 5,680,458 A  * 10/1997  Spelman et al. .............. 380/277
5,850,444 A    12/1998  Rune
(Continued)

FOREIGN PATENT DOCUMENTS

EP    1 513 068 A1    3/2005
JP    7-58689          3/1995
(Continued)

OTHER PUBLICATIONS

Perrig et al., The TESLA Broadcast Authentication Protocol, 2002, http://www.ece.cmu.edu/~adrian/projects/tesla-cryptobytes/tesla-cryptobytes.ps.*

(Continued)

*Primary Examiner* — Hoon J Chung
(74) *Attorney, Agent, or Firm* — Oblon, Spivak, McClelland, Maier & Neustadt, L.L.P.

(57) ABSTRACT

In a mobile communication system, a radio device is configured to transmit notification information transmitted from a distribution server, to a mobile station, by use of broadcast communication. The distribution server 10 includes a key transmitter unit 12 configured to transmit a public key of the distribution server 10 to the mobile station UE; the radio device RNC, Node B includes a notification information transmitter unit 22, 42, 42A configured to transmit, to the mobile station UE, the notification information transmitted from the distribution server 10; and the mobile station UE includes an authentication unit 36 configured to authenticate the validity of the received notification information in reference to an electronic signature for the notification information.

9 Claims, 10 Drawing Sheets

(56) References Cited

U.S. PATENT DOCUMENTS

| | | | |
|---|---|---|---|
| 6,311,274 | B1 | 10/2001 | Day |
| 7,283,045 | B1* | 10/2007 | Manz ........................ 340/506 |
| 2003/0003895 | A1 | 1/2003 | Wallentin et al. |
| 2004/0176112 | A1 | 9/2004 | Beckmann et al. |
| 2005/0216945 | A1* | 9/2005 | Kataoka ..................... 725/116 |
| 2006/0146740 | A1* | 7/2006 | Sheynman et al. ......... 370/312 |
| 2007/0014536 | A1* | 1/2007 | Hellman ...................... 386/94 |
| 2007/0101146 | A1* | 5/2007 | Louch et al. ................ 713/176 |

FOREIGN PATENT DOCUMENTS

| | | |
|---|---|---|
| JP | 10-42365 | 2/1998 |
| JP | 11-234225 | 8/1999 |
| JP | 2000-244976 | 9/2000 |
| JP | 2001-500327 | 1/2001 |
| JP | 2003-58470 | 2/2003 |
| JP | 2003-318886 | 11/2003 |
| JP | 2004-538731 | 12/2004 |
| WO | WO 03/015440 A1 | 2/2003 |

OTHER PUBLICATIONS

Imran, Architecture of the GSM Network, Feb. 12, 2007, Mobile Is Good, http://web.archive.org/web/20070212233857/http://www.mobileisgood.com/ArchitectureOfTheGSMNetwork.php.*

Office Action issued Oct. 25, 2010, in Chinese Patent Application No. 2007800229663 with English translation.

Office Action issued Nov. 30, 2010, in Japanese Patent Application No. 2008-522478 (with English translation).

Japanese Office Action issued on Mar. 8, 2011 in corresponding Japanese Application No. 2008-522478 (with an English Translation).

Office Action issued on Aug. 4, 2011 in the corresponding Taiwanese Patent Application No. 096122084 (with English Translation).

"3GPP TS23.041", 3rd Generation Partnership Project; Technical Specification Group Terminals; Technical Realization of Cell Broadcast Service (CBS) (Release 7), V7.0.0 (Mar. 2006), 3GPP™, 36 pages.

"3GPP TS23.246", 3rd Generation Partnership Project; Technical Specification Group Services and System Aspects; Multimedia Broadcast/ Multicast Service (MBMS); Architecture and Functional Description (Release 6), V6.10.0 (Jun. 2006), 3GPP™, 47 pages.

Extended European Search Report issued Dec. 19, 2011, in Patent Application No. 07767204.6.

Office Action issued Aug. 7, 2012 in Japanese Patent Application No. 2011-127664 with English language translation.

"Threats of unprotected bootstrap and multicast signalling in LTE", Ericsson, 3GPP S3-060233, Apr. 4-7, 2006, 1 page.

* cited by examiner

MOBILE COMMUNICATION SYSTEM, MOBILE COMMUNICATION METHOD, DISTRIBUTION SERVER, RADIO NETWORK CONTROLLER AND MOBILE STATION

BACKGROUND OF THE INVENTION

1. Field of the Invention

The present invention relates to a mobile communication system, a mobile communication method, a distribution server, a radio network controller and a mobile station, employing a configuration in which a radio device transmits, to mobile stations, by use of broadcast communication, emergency information transmitted from a distribution server.

2. Description of the Related Art

Heretofore, there have been known mobile communication systems for transmitting emergency information such as earthquake information or "tsunami" information issued by a public office, a local government, or the like.

The emergency information is transmitted to mobile stations by use of broadcast communication such as a cell broadcast service (hereinafter, referred to as a "CBS") or a multimedia broadcast/multicast service (hereinafter, referred to as an "MBMS").

Specifically, in such a mobile communication system for transmitting the emergency information, a radio network controller RNC is configured to transmit the aforementioned emergency information to mobile stations located in a particular coverage area, by use of a traffic channel for broadcast communication such as a common traffic channel (CTC) or an MBMS traffic channel (MTCH).

Here, the emergency information is received from a terminal device of a public office, a local government, or the like, via a distribution server.

In such conventional mobile communication systems for transmitting the emergency information, however, the mobile station is not configured to perform authentication of the sender of the emergency information which is by use of broadcast communication.

For this reason, there are problems that credibility of the sender of the emergency information may be lost, and that the receivers may be confused, when the false emergency information is issued by transmission of fake emergency information from an unauthorized radio base station.

(Non-Patent document 1) 3GPP TS23.041
(Non-Patent document 2) 3GPP TS23.246

DISCLOSURE OF THE INVENTION

The present invention is made while taking the aforementioned problems into consideration. An object of the present invention is to provide a mobile communication system, a mobile communication method, a distribution server, a radio network controller and a mobile station which are capable of preventing one from pretending to be the sender of the emergency information, when the emergency information is transmitted to mobile stations, by use of broadcast communication.

A first aspect of the present invention is summarized as a mobile communication system in which a radio device is configured to transmit notification information transmitted from a distribution server, to a mobile station, by use of broadcast communication, wherein the distribution server includes a key transmitter unit configured to transmit a public key of the distribution server to the mobile station; the radio device includes a notification information transmitter unit configured to transmit, to the mobile station, the notification information transmitted from the distribution server; and the mobile station includes an authentication unit configured to authenticate the validity of the received notification information in reference to an electronic signature for the notification information.

In the first aspect, the radio device can include a radio network controller and a radio base station; the notification information transmitter unit can be provided at the radio base station; the notification information transmitter unit of the radio base station can be configured to transmit the notification information by use of a channel for notifying a specific mobile station that there is incoming information; and the key transmitter unit of the distribution server can be configured to transmit the public key of the distribution server, to the mobile station, by use of a traffic channel for broadcast communication.

In the first aspect, the radio device can include a radio network controller and a radio base station, the notification information transmitter unit can be provided at the radio network controller; the notification information transmitter unit of the radio network controller can be configured to transmit the notification information by use of a channel for notifying a specific mobile station that there is incoming information; and the key transmitter unit of the distribution server can be configured to transmit the public key of the distribution server, to the mobile station by use of a traffic channel for broadcast communication.

In the first aspect, the distribution server can further include: an electronic signature creation unit configured to create an electronic signature for the notification information; and an electronic signature transmitter unit configured to transmit the created electronic signature, to the mobile station by use of a traffic channel for broadcast communication.

In the first aspect, the distribution server can include: an electronic signature creation unit configured to create an electronic signature for the notification information; and an electronic signature transmitter unit configured to transmit the created electronic signature to the radio network controller, wherein the notification information transmitter unit of the radio network controller can be configured to transmit, to the mobile station, by use of a channel for notifying a specific mobile station that there is incoming information, the electronic signature along with the notification information.

In the first aspect, the radio network controller can include an electronic signature creation unit configured to create an electronic signature for the received notification information, and the notification information transmitter unit of the radio network controller can be configured to transmit, by use of a channel for notifying a specific mobile station that there is incoming information, the electronic signature along with the notification information, to the mobile station.

A second aspect of the present invention is summarized as a mobile communication method for transmitting from a radio device to a mobile station, by use of broadcast communication, notification information transmitted from a distribution sever, the method including: transmitting, at the distribution server, a public key of the distribution server to the mobile station; transmitting, at the radio device, the notification information transmitted from the distribution server, to the mobile station; and authenticating, at the mobile station, the validity of the notification information, in reference to an electronic signature for the received notification information.

A third aspect of the present invention is summarized as a distribution server configured to transmit, to a mobile station, through a radio device, notification information by use of broadcast communication, including: a key transmitter unit configured to transmit a public key of the distribution server, to the mobile station; a notification information transmitter unit configured to transmit the notification information, to the radio device; an electronic signature creation unit configured to create an electronic signature for the notification information; and an electronic signature transmitter unit configured to transmit the created electronic signature, to the radio device.

A fourth aspect of the present invention is summarized as a radio network controller configured to transmit, to a mobile station, by use of broadcast communication, notification information transmitted from a distribution server, including: a notification information transmitter unit configured to transmit, to the mobile station, by use of a channel for notifying a specific mobile station that there is incoming information, the notification information and an electronic signature for the notification information, which are received from the distribution server.

A fifth aspect of the present invention is summarized as a radio network controller configured to transmit, to a mobile station, by use of broadcast communication, notification information transmitted from a distribution server, including: an electronic signature creation unit configured to create an electronic signature for the notification information received from the distribution server; and a notification information transmitter unit configured to transmit, to a specific mobile station, by use of a channel for notifying the specific mobile station that there is incoming information, the notification information received from the distribution server and the electronic signature created, to the mobile station.

A sixth aspect of the present invention is summarized as a mobile station configured to receive notification information transmitted by use of broadcast communication, including: a notification information receiver unit configured to receive the notification information through a control channel for starting the broadcast communication; an authentication unit configured to authenticate the validity of the notification information, in reference to an electronic signature for the received notification information; and a notification information display unit configured to control, in reference to a result of the authentication, a display method for the notification information.

In the sixth aspect, the mobile can further include: an electronic signature receiver unit configured to receive the electronic signature through a traffic channel for the broadcast communication, wherein the display unit is configured to display information indicating that the notification information is false when the result of the authentication is negative, after displaying the notification information received through the control channel.

In the sixth aspect, the mobile station can further include: an electronic signature receiver unit configured to receive the electronic signature through a control channel for starting the broadcast communication, wherein the display unit is configured not to display the notification information received through the control channel when the result of the authentication is negative.

BEST MODES FOR CARRYING OUT THE INVENTION (Mobile Communication System According to First Embodiment of the Invention)

A configuration of a mobile communication system according to a first embodiment of the present invention will be described with reference to FIGS. 1 to 5.

In the mobile communication system according to the present embodiment, a radio device (a radio network controller RNC, a base station Node B, or the like) is configured to transmit "emergency information (such as earthquake information or "tsunami" information issued by a public office, a local government, or the like)" which is a type of notification information transmitted from a distribution server 10, to mobile stations LE, by use of a cell broadcast service (CBS).

Figure 1:
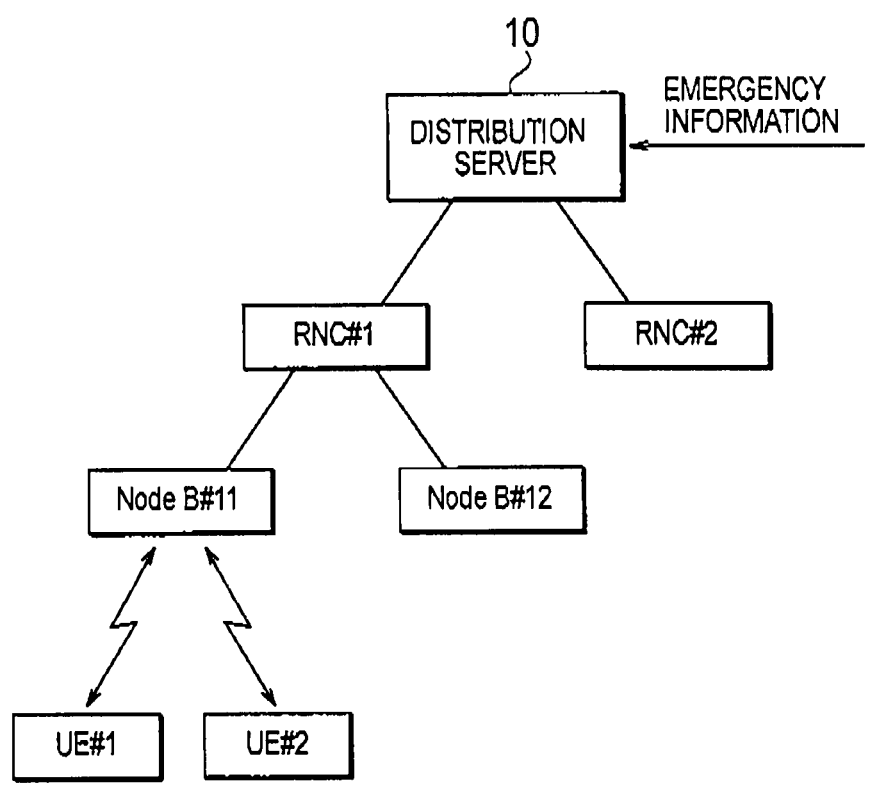
FIG. 1 is an overall configuration diagram of a mobile communication system according to a first embodiment of the invention.

Specifically, as shown in FIG. 1, the mobile communication system according to the present embodiment includes: a distribution server 10; a plurality of radio network controllers RNC #1 and #2; a plurality of radio base stations Nodes B #11 and #12; and a plurality of mobile stations UE #1 and #2.

It should be noted that, although, for the sake of convenience of description, two units each of the exchange nodes SGSN, radio network controllers RNC, radio base stations Node B and mobile stations UE are shown in the example of FIG. 1, the present invention can be applied to an exemplary case where the mobile communication system includes more than two units each of these devices as a matter of course.

The distribution server 10 functions as a cell broadcast center (hereinafter, referred to as a "CBC") or as a BM-SC.

The distribution server 10 is configured to receive the emergency information such as earthquake information or "tsunami" information issued by a public office, a local government, or the like, in a case where an event such as an earthquake or a tsunami occurs; and then to transmit such emergency information to predetermined radio network controllers RNC.

Figure 2:
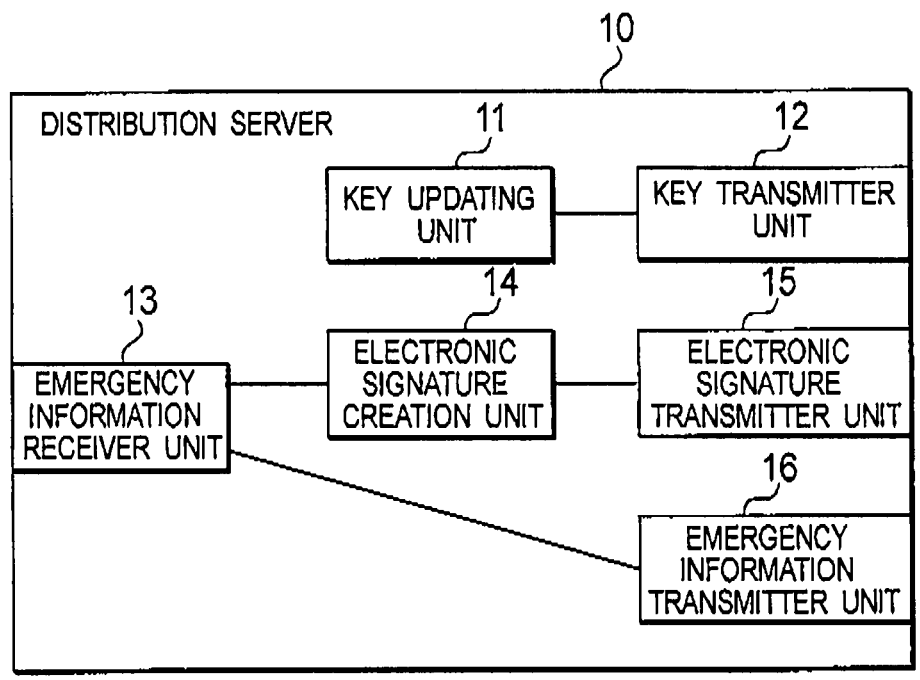
FIG. 2 is a functional block diagram of a distribution server according to the first embodiment of the invention.

Specifically, as shown in FIG. 2, the distribution server 10 includes a key updating unit 11, a key transmitter unit 12, an emergency information receiver unit 13, an electronic signature creation unit 14, an electronic signature transmitter unit 15 and an emergency information transmitter unit 16.

The key updating unit 11 is configured to update a public key and secret key of the distribution server 10 at a predetermined timing.

For example, the key updating unit 11 may be configured to update the public key and secret key of the distribution server 10 every time the emergency information is distributed.

The key transmitter unit 12 is configured to transmit a public key of the distribution server 10, to mobile stations UE.

Specifically, the key transmitter unit 12 is configured to transmit a public key of the distribution server 10, to mobile stations UE, by use of a common traffic channel (hereinafter referred to as a "CTCH") or an MBMS traffic channel (hereinafter referred to as an "MTCH") for a CBS or MBMS (broadcast communication).

The emergency information receiver unit 13 is configured to receive a distribution request for the emergency information such as earthquake information or "tsunami" information, from a public office, a local government or the like.

Here, it is assumed that such distribution request includes the emergency information and information on a distribution area (a paging area or an MBMS service area) of the emergency information.

The electronic signature creation unit 14 is configured to create, by use of a secrete key of the distribution server 10, an electronic signature (specifically, an electronic signature for certifying credibility of the sender of emergency information) for the emergency information received by the emergency information receiver unit 13.

The electronic signature transmitter unit 15 is configured to transmit, to mobile stations UE, by use of the traffic channel CTCH or MTCH for a CBS or MBMS (broadcast communication), the aforementioned electronic signature created by the electronic signature creation unit 14.

The emergency information transmitter unit 16 is configured to transmit, to a radio network controller RNC, by use of the Service Area Broadcast Protocol (SABP) specified by the 3GPP TS25-419, the emergency information received by the emergency information receiver unit 13.

Figure 3:
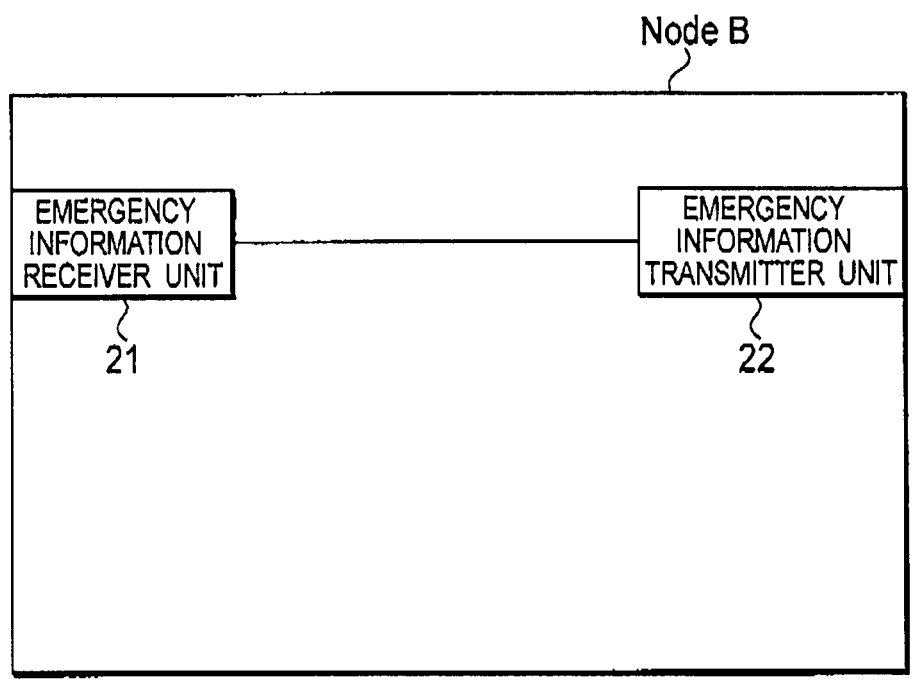
FIG. 3 is a functional block diagram of a radio base station Node B according to the first embodiment of the invention.

AS shown in FIG. 3, the radio base station Node B includes an emergency information receiver unit 21 and an emergency information transmitter unit 22.

The emergency information receiver unit 21 is configured to receive, through a radio network controller RNC, the emergency information transmitted from the distribution server 10.

The emergency information transmitter unit 22 is configured to transmit, to mobile stations UE, the emergency information transmitted from the distribution server 10.

Specifically, the emergency information transmitter unit 22 is configured to transmit the aforementioned emergency information, by use of a paging indication channel (PICH) or an MBMS indication channel (MICH) for notifying a specific mobile station (mobile station belonging to a specific group) that there is incoming information.

Figure 4:
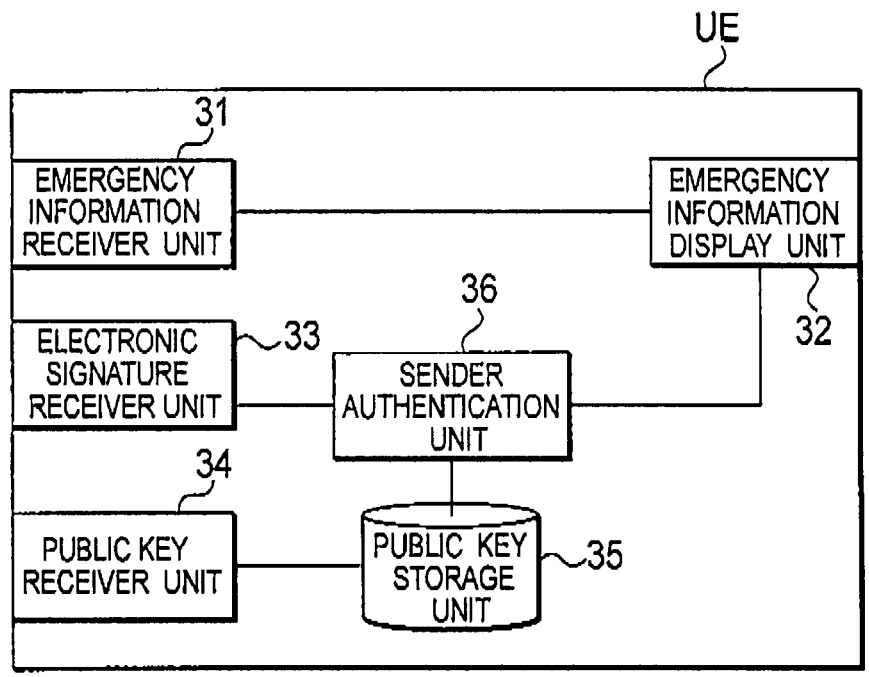
FIG. 4 is a functional block diagram of a mobile station UE according to the first embodiment of the invention.

As shown in FIG. 4, the mobile station UE includes an emergency information receiver unit 31, an emergency information display unit 32, an electronic signature receiver unit 33, a public key receiver unit 34, a public key storage unit 35 and a sender authentication unit 36.

The emergency information receiver unit 31 is configured to receive the aforementioned emergency information through a control channel PICH or MICH for starting a CBS or MBMS (broadcast communication).

The electronic signature receiver unit 33 is configured to receive the aforementioned electronic signature through a traffic channel CTCH or MTCH for a CBS or MBMS (broadcast communication).

The public key receiver unit 34 is configured to receive a public key of the distribution server 10 through a traffic channel CTCH or MBMS for a CBS or MBMS (broadcast communication).

The public key storage unit 35 is configured to store, therein, the public key of the distribution server 10, received by the public key receiver unit 34.

The sender authentication unit 36 is configured to authenticate, in reference to the aforementioned electronic signature and the public key stored in the public key storage unit 35, the validity of the emergency information displayed on the emergency information display unit 32 (specifically, to authenticate the credibility of the distribution source of the emergency information).

The emergency information display unit 32 is configured to display the emergency information included in the PICH or MICH received by the emergency information receiver unit 31.

Figure 5:
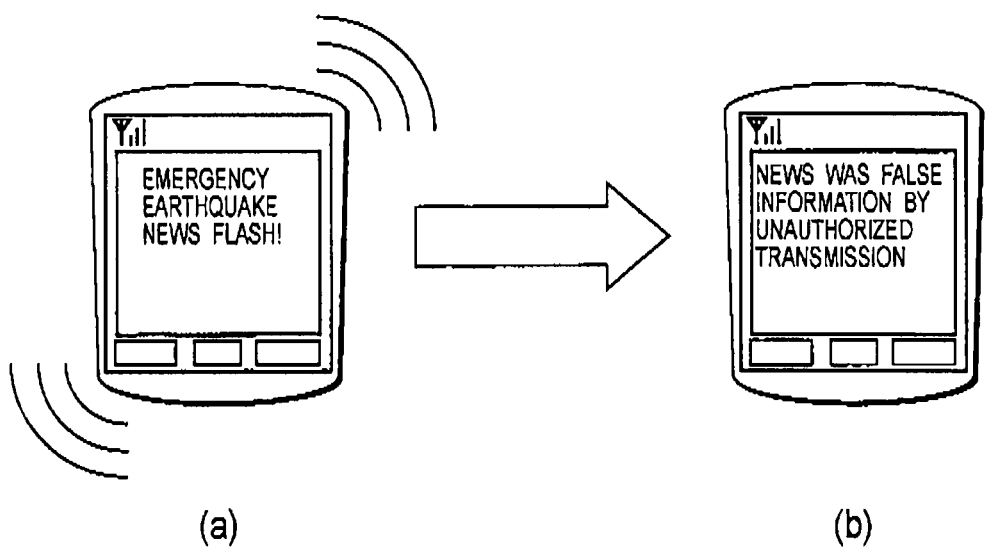
FIGS. 5(a) and 5(b) are diagrams each showing an example of the display of the mobile station UE according to the first embodiment of the invention.

Specifically, the emergency information display unit 32 may be configured to display the simplified information on a display as shown in FIG. 5($a$), or may be configured to notify the user, by use of an alarm or vibration function, that the simplified information has been received.

Furthermore, the emergency information display unit 32 is configured to control a display method of the emergency information in reference to a result of the authentication by the sender authentication unit 36.

Specifically, the emergency information display unit 32 is configured to first display the emergency information received through a PICH or MICH.

Thereafter, in a case where the result of the authentication is negative (that is, when the credibility of the distribution source of the emergency information is not authenticated), the emergency information display unit 32 is configured to display information indicating that the aforementioned emergency information is false, as shown in FIG. 5($b$).

(Operation of Mobile Communication System According to First Embodiment of the Invention)

Hereinafter, an operation of the mobile communication system according to the present embodiment will be described with reference to FIG. 6.

Figure 6:
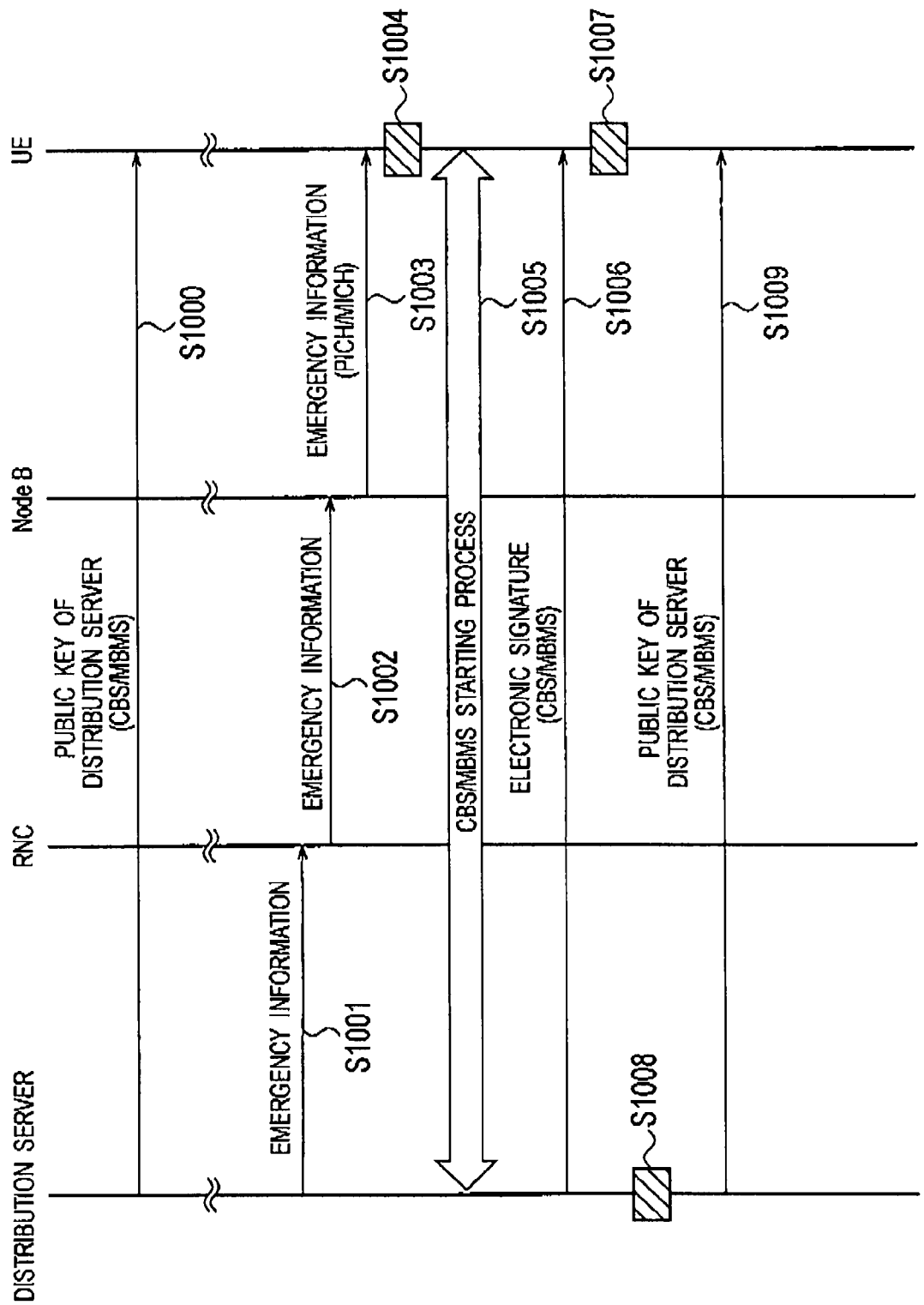
FIG. 6 is a sequence diagram showing an operation of transmitting emergency information in the mobile communication system according to the first embodiment of the invention.

As shown in FIG. 6, in step S1000, the distribution server 10 transmits a public key of the distribution server 10, to a mobile station UE, by use of a CTCH or MTCH which is a traffic channel for a CBS or MBMS.

In step 1001, upon receipt of a distribution request for the emergency information such as earthquake information or "tsunami" information from a public office, a local office, or the like, the distribution server 10 transmits the emergency information to a radio network controller RNC corresponding to a distribution area included in the distribution request.

In step 1002, the radio network controller RNC transmits the received emergency information to a radio base station Node B.

In step S1003, the radio base station Node B transmits the aforementioned emergency information to the mobile station UE by use of a PICH or MICH.

In step S1004, the mobile station UE displays, as shown in FIG. 5($a$), the emergency information included in the PICH or MICH transmitted from the radio base station Node B.

For example, the mobile station UE may be configured to display the emergency information for notifying an "occurrence of earthquake" in a case where "0101" is set in the last 4 bits of predetermined 12 bits in the PICH or MICH, and to display the emergency information to notify an "occurrence of flood" in a case where "1010" is set in the last 4 bits of the 12 bits.

In step S1005, processing for starting a CBS or MBMS (broadcast communication) is performed.

In step S1006, after the aforementioned processing is completed, the distribution server 10 creates an electronic signature for the emergency information by use of a public key of the distribution server 10, and then transmits the electronic signature to the mobile station UE, by use of a traffic channel CTCH or MTCH for a CBS or MBMS (broadcast communication).

In step S1007, in reference to the received electronic signature and the public key of the distribution server 10 stored in the public key storage unit 35, the mobile station UE authenticates the validity of the emergency information displayed in step S1004.

In a case where the result of the authentication is negative, the mobile station UE displays information indicating that the emergency information is false, as shown in FIG. 6B.

In step S1008, the distribution server 10 updates the public key and secret key of the distribution sever 10, and, in step S1009, transmits the public key of the distribution sever 10 to the mobile station UE, by use of a CTCH or MTCH which is a traffic channel for a CBS or MBMS.

(Effect and Advantage of Mobile Communication System According to First Embodiment of the Invention)

In the mobile communication system according to the present embodiment, the mobile station UE first displays emergency information transmitted by use of a PICH or MICH, and thereafter authenticates the validity thereof by use of the electronic signature for the emergency information, transmitted by use of a CTCH or MTCH.

Thus, a delay time in the delivery of the emergency information to the mobile station UE can be reduced, while preventing one from pretending to be the sender of the emergency information.

(Mobile Communication System According to Second Embodiment of the Invention)

Hereinafter, a mobile communication system according to a second embodiment of the present invention will be described with reference to FIGS. 7 and 8.

The description of the mobile communication system according to the present invention will be provided below, by focusing on differences from the mobile communication system according to the first embodiment.

Figure 7:
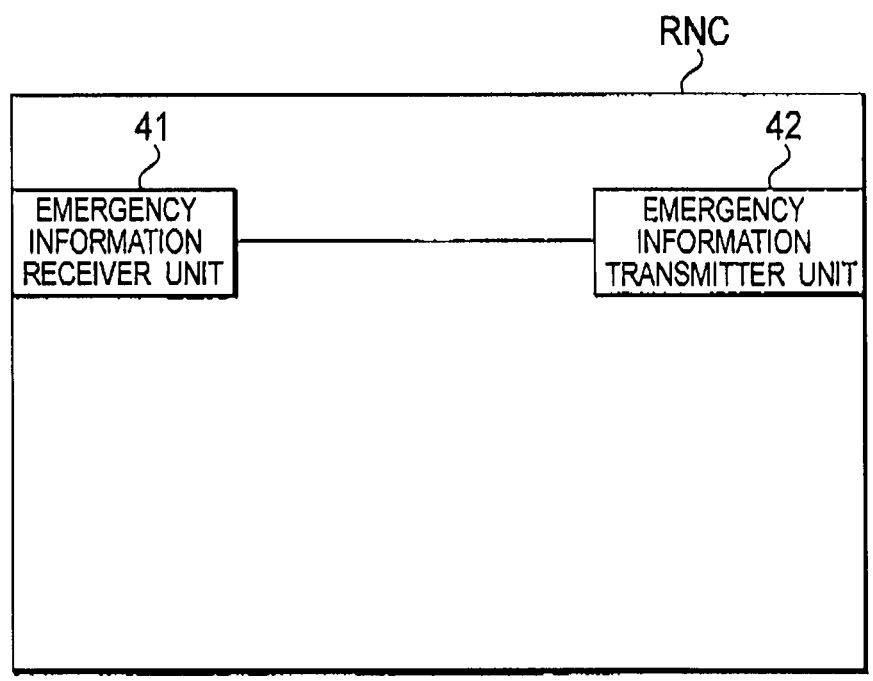
FIG. 7 is a functional block diagram of a radio network controller RNC according to the second embodiment of the invention.

As shown in FIG. 7, a radio network controller RNC includes an emergency information receiver unit 41 and an emergency information transmitter unit 42.

The emergency information receiver unit 41 is configured to receive the emergency information transmitted from the distribution server 10.

The emergency information transmitter unit 42 is configured to transmit the emergency information transmitted from the distribution server 10, to mobile stations UE.

Specifically, the emergency information transmitter unit 42 is configured to transmit the aforementioned emergency information, by use of a paging control channel (PCCH) or an MBMS control channel (MCCH), each of which is a channel for notifying a specific mobile station that there is incoming information.

Hereinafter, an operation of the mobile communication system according to the present embodiment will be described with reference to FIG. 8.

Figure 8:
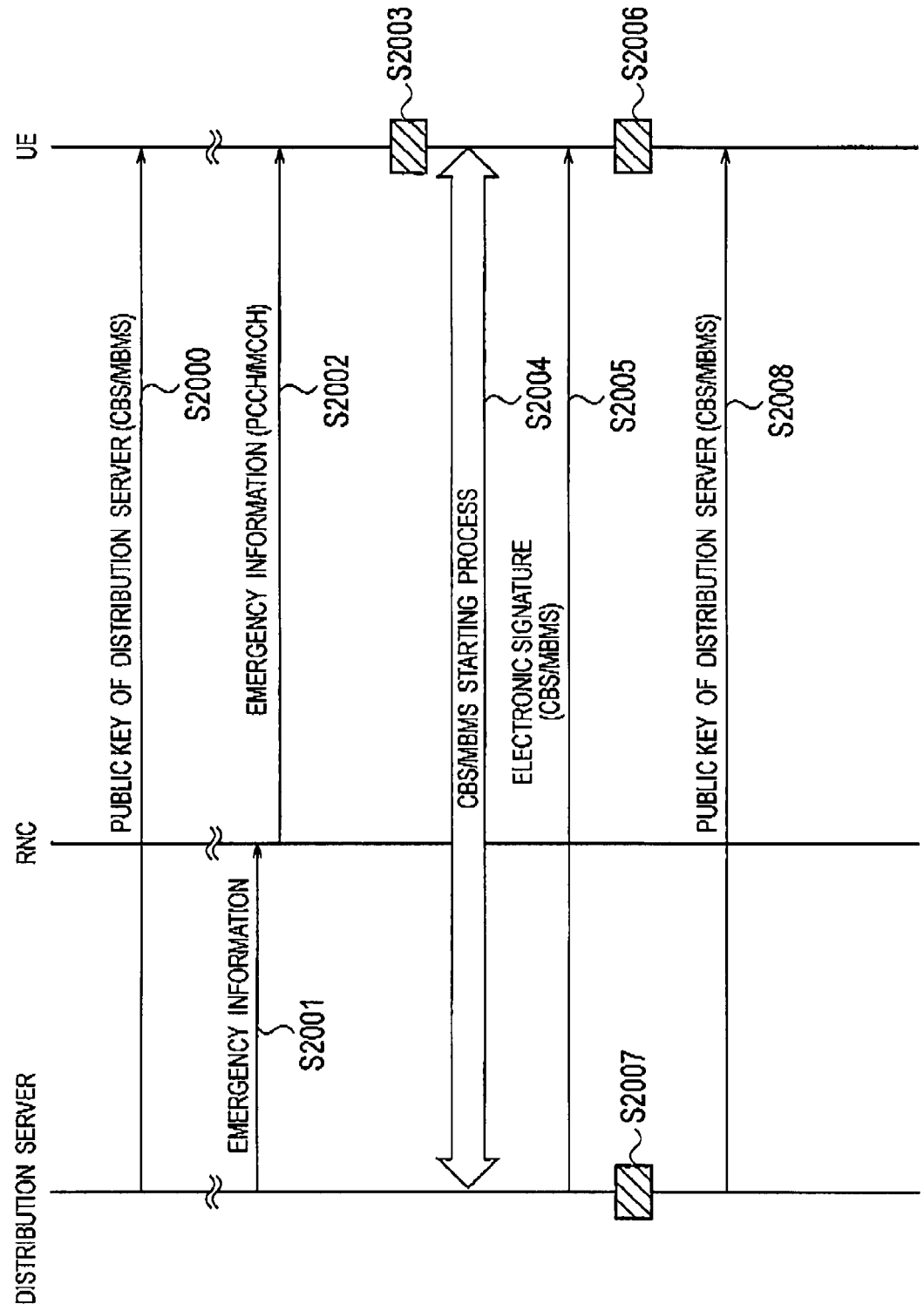
FIG. 8 is a sequence diagram showing an operation of transmitting emergency information in the mobile communication system according to the second embodiment of the invention.

As shown in FIG. 8, in step S2000, the distribution server 10 distributes a public key of the distribution server 10, to a mobile station UE, by use of a CTCH or MTCH which is a traffic channel for a CBS or MBMS.

In step 2001, upon receipt of a distribution request for earthquake information, "tsunami" information, or the like, from a public office, a local government, or the like, the distribution server 10 transmits the emergency information, to a radio network controller RNC corresponding to a distribution area included in such distribution request.

In step S2002, the radio network controller RNC transmits the received emergency information to the mobile station UE by use of a PCCH or MCCH.

In step S2003, the mobile station UE displays, as shown in FIG. 5(a), the emergency information included in the PCCH or MCCH transmitted from the radio network controller RNC.

For example, the mobile station UE may be configured to display the reception of the emergency information inputted to the "payload capacity (240 bits) (refer to 3GPP TS34.108)" of the PCCH or MCCH.

The operations in steps S2004 to S2008 are the same as that in the aforementioned steps S1005 to S1009.

In the mobile communication system according to the present embodiment, the mobile station first displays the emergency information transmitted by use of a PCCH or MCCH and thereafter, authenticates the validity thereof by use of an electronic signature for the emergency information, transmitted by use of a CTCH or MTCH.

Thus, a delay time in the delivery of the emergency information to the mobile station UE can be reduced, while preventing one from pretending to be the sender of the emergency information.

(Mobile Communication System According to Third Embodiment of the Invention)

Hereinafter, a mobile communication system according to a third embodiment of the present invention will be described with reference to FIGS. 9 to 11.

The description of the mobile communication system according to the present invention will be provided below by focusing on differences from the mobile communication system according to the first embodiment.

Figure 9:
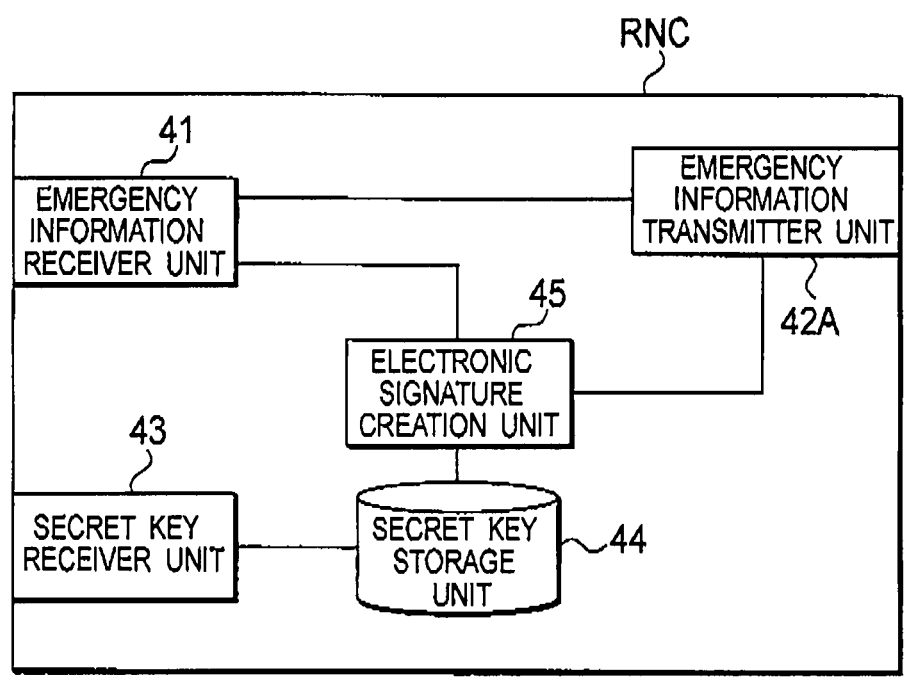
FIG. 9 is a functional block diagram of a radio network controller RNC according to the third embodiment of the invention.

As shown in FIG. 9, a radio network controller RNC includes an emergency information receiver unit 41, an emergency information transmitter unit 42A, a secret key receiver unit 43, a secret key storage unit 44 and an electronic signature creation unit 45.

The secret key receiver unit 43 is configured to receive a secret key of the distribution server 10, transmitted from the distribution server 10.

The secret key storage unit 44 is configured to store, therein, the secret key of the distribution server 10, received by the secret key receiver unit 43.

The electronic signature creation unit 45 is configured to create an electronic signature for the emergency information.

The emergency information is created by using the emergency information received by the emergency information receiver unit 41, and the secret key of the distribution server 10 stored in the secret key storage unit 44.

The emergency information transmitter unit 42A is configured to transmit, to a mobile station UE, by use of a PCCH or MCCH, the electronic signature created by the electronic signature creation unit 45, along with the aforementioned emergency information.

Figure 10:
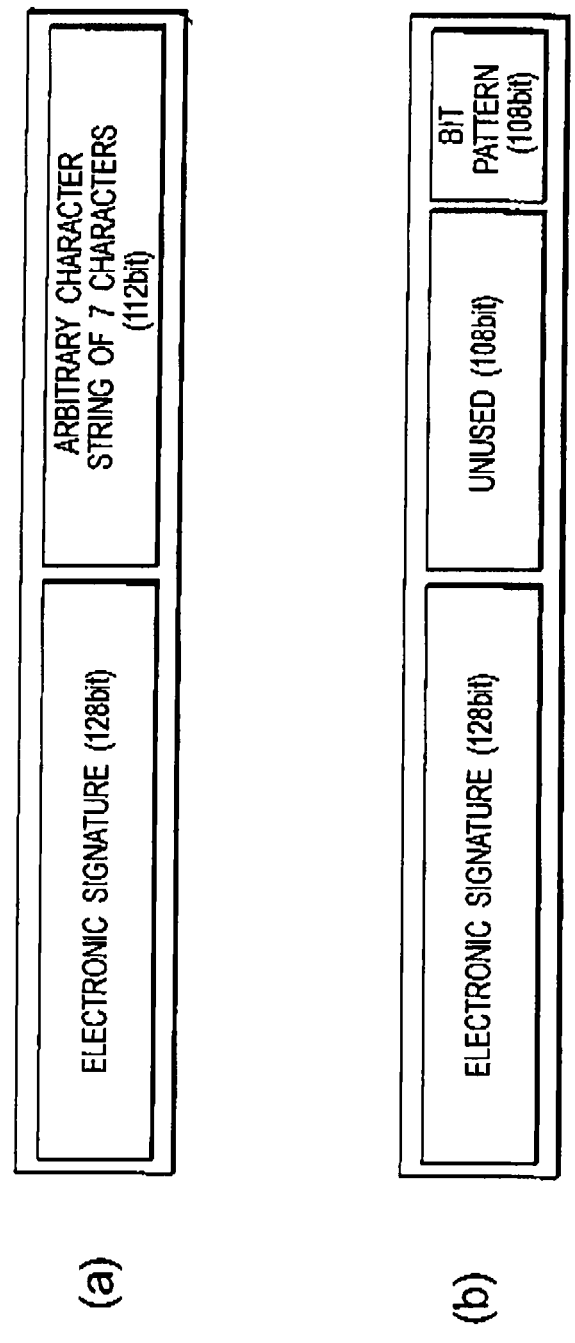
FIGS. 10(a) and 10(b) are diagrams each showing an example of a PCCH or MCCH which is to be created by the radio network controller RNC according to the third embodiment of the invention.

Specifically, the emergency information transmitter unit 42A may be configured to input an arbitrary character string indicating the emergency information, and the electronic signature for the emergency information, to the "payload capacity (240 bits)" of the PCCH or MCCH as shown in FIG. 10(*a*).

Moreover, the emergency information transmitter unit 42A may be configured to input a bit pattern (for example, the aforementioned "0101", "1010", or the like) corresponding to the emergency information, and the electronic signature for the emergency information, to the "payload capacity (240 bits)" of the PCCH or MCCH as shown in FIG. 10(*b*).

Hereinafter, an operation of the mobile communication system according to the present embodiment will be described with reference to FIG. 11.

Figure 11:
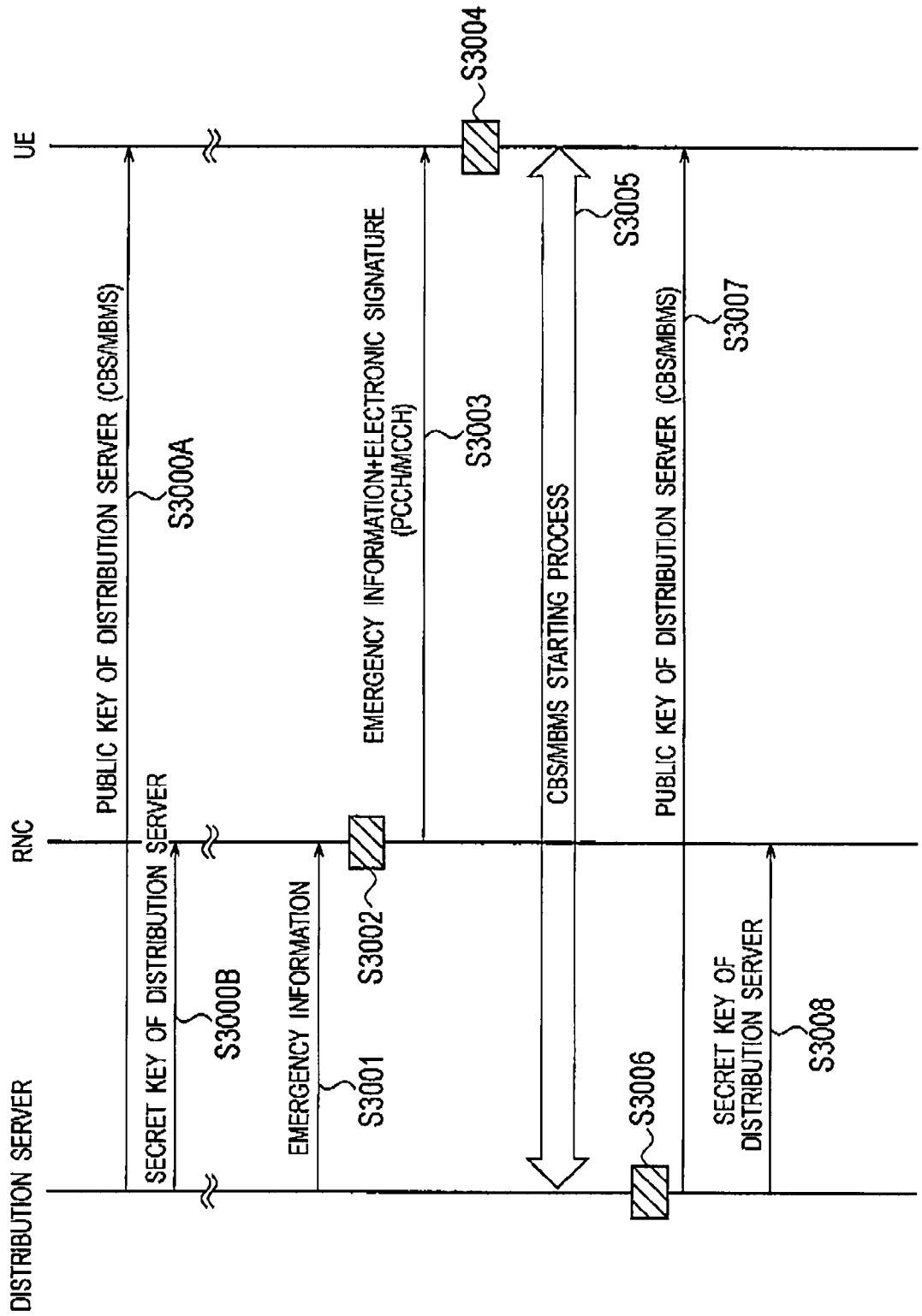
FIG. 11 is a sequence diagram showing an operation of transmitting emergency information in the mobile communication system according to the third embodiment of the invention.

As shown in FIG. 11, in step S3000A, the distribution server 10 transmits a public key of the distribution server 10, to a mobile station UE, by use of a CTCH or MTCH which is a traffic channel for a CBS or MBMS.

In step S3000B, the distribution server 10 transmits a secret key of the distribution server 10, to a radio network controller RNC.

In step S3001, upon receipt of a distribution request for the emergency information such as earthquake information or "tsunami" information from a public office, a local office, or the like, the distribution server 10 transmits the emergency information, to a radio network controller RNC corresponding to a distribution area included in the distribution request.

In step S3002, the radio network controller RNC creates an electronic signature for the emergency information by use of the received emergency information, and the secret key of the distribution server 10 stored in the secret key storage unit 44.

In step S3003, the radio network controller RNC transmits the received emergency information and the created electronic signature, to the mobile station UE by use of a PCCH or MCCH.

In step S3004, in reference to the received electronic signature and the public key of the distribution server 10 stored in the public key storage unit 45, the mobile station UE authenticates the validity of the emergency information.

In a case where a result of the authentication is affirmative, the mobile station UE displays the received emergency information.

On the other hand, in a case where the result of the authentication is negative, the mobile station UE determines that the aforementioned emergency information is false and does not display the emergency information.

For example, the mobile station UE may be configured to display emergency information for notifying the "occurrence of earthquake" in a case where "0101" is set in the last 4 bits of predetermined 12 bits in a PICH or MCCH, and to display emergency information for notifying the "occurrence of flood" in a case where "1010" is set in the last 4 bits of the predetermined 12 bits.

In step S3005, processing for starting a CBS or MBMS (broadcast communication) is performed.

In step S3006, the distribution server 10 updates the public key and secret key of the distribution server 10, and in step S3007, transmits the public key of the distribution server 10 to the mobile station UE by use of a CTCH or MTCH which is a traffic channel for a CBS or MBMS.

Furthermore, in step S3008, the distribution sever 10 transmits a secret key of the distribution server 10, to the radio network controller RNC.

(Mobile Communication System According to Fourth Embodiment of the Invention)

Hereinafter, a mobile communication system according to a fourth embodiment of the present invention will be described with reference to FIG. 12.

The description of the mobile communication system according to the present invention will be provided below by focusing on differences from the aforementioned mobile communication system according to the first embodiment.

Hereinafter, an operation of the mobile communication system according to the present embodiment will be described with reference to FIG. 12.

Figure 12:
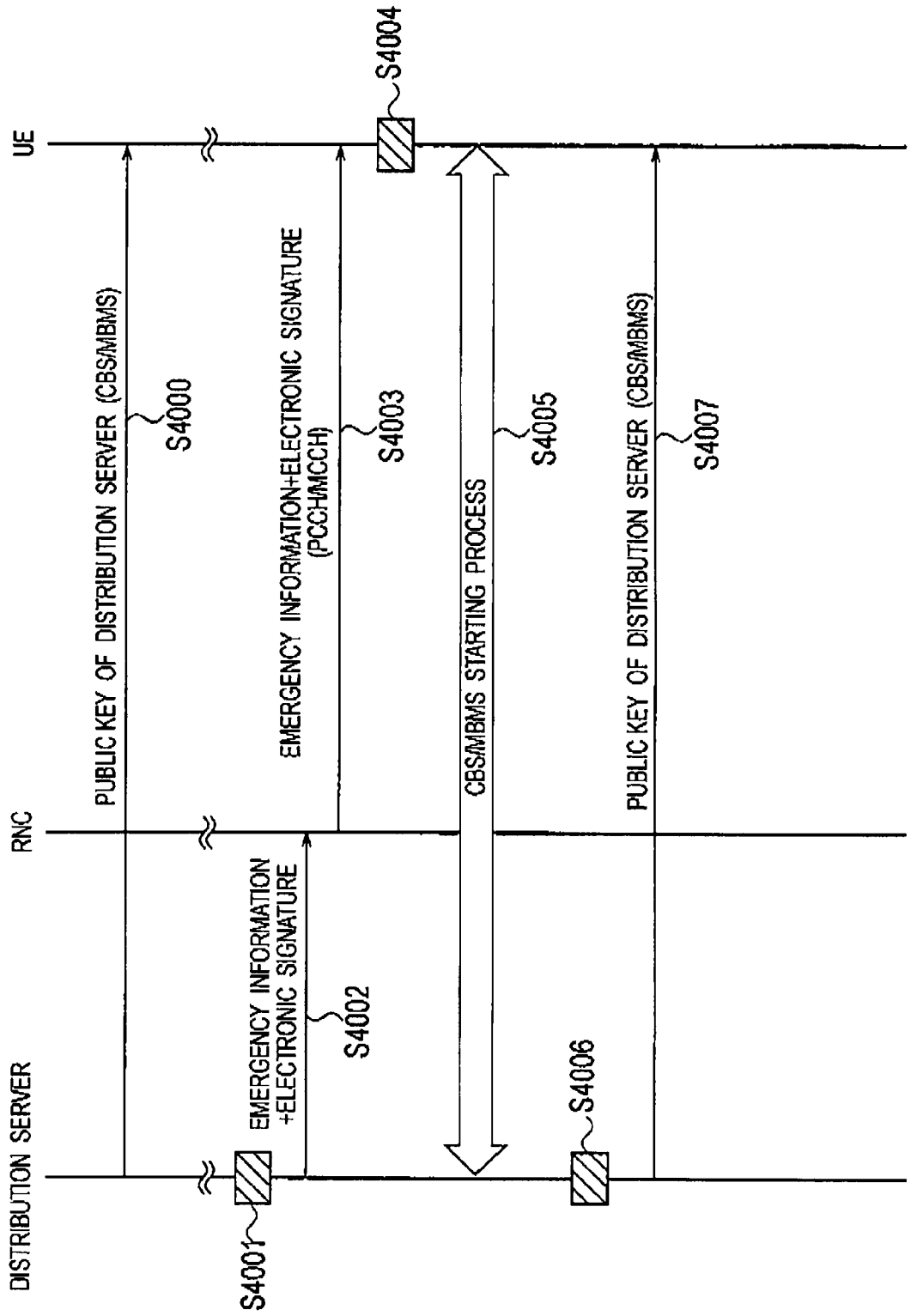
FIG. 12 is a sequence diagram showing an operation of transmitting emergency information in the mobile communication system according to the fourth embodiment of the invention.

As shown in FIG. 12, in step S4000, the distribution server 10 transmits a public key of the distribution server 10, to a mobile station UE, by use of a CTCH or MTCH which is a traffic channel for a CBS or MBMS.

In step 4001, the distribution server 10 receives a distribution request for the emergency information such as earthquake information or "tsunami" information from a public office, a local office, or the like, and creates an electronic signature for the emergency information by use of the emergency information included in the received distribution request, and a secret key of the distribution server 10.

In step S4002, the distribution server 10 transmits the emergency information and the electronic signature for the emergency information, to a radio network controller RNC corresponding to a distribution area included in the distribution request.

In step S4003, the radio network controller RNC transmits the received emergency information and the electronic signature, to a mobile station UE by use of a PCCH or MCCH.

In step S4004, in reference to the received electronic signature and the public key of the distribution server 10 stored in the public key storage unit 35, the mobile station UE authenticates the validity of the emergency information.

In a case where a result of the authentication is affirmative, the mobile station UE displays the received emergency information.

On the other hand, in a case where the result of the authentication is negative, the mobile station UE determines that the aforementioned emergency information is false, and does not display the emergency information.

For example, the mobile station UE may be configured to display the emergency information for notifying the "occurrence of earthquake" in a case where "0101" is set in the last 4 bits of predetermined 12 bits in a PICH or MCCH, and to display the emergency information for notifying the "occurrence of flood" in a case where "1010" is set in the last 4 bits of the predetermined 12 bits.

In step S4005, processing for starting a CBS or MBMS (broadcast communication) is performed.

In step S4006, the distribution server 10 updates the public key and secret key of the distribution server 10, and in step S4007, transmits the public key of the distribution server 10, to the mobile station UE, by use of a CTCH or MTCH which is a traffic channel for a CBS or MBMS.

The entire contents of the Japanese patent application no. 2006-169435 (filed on Jun. 19, 2006) are incorporated herein by reference.

Further, the entire contents of "3GPP TS23.041" and "3GPP TS23.246" are incorporated herein by reference.

The present invention has been described by using the above-described embodiments. However, it is obvious for those who are in the art that the present invention is not intended to be limited to the above-described embodiment. It is understood that the examples and embodiments described herein are for illustrative purpose only and that various modifications or changes will be suggested to one skilled in the art without departing from the scope of the present invention. Accordingly, this disclosure should not be construed that the description and the drawings, which constitute one part of this disclosure, are to limit the present invention.

INDUSTRIAL APPLICABILITY

As described above, according to the present invention, it is possible to provide a mobile communication system, a mobile communication method, a distribution server, a radio network controller and a mobile station which are capable of preventing one from pretending to be the sender of the emergency information, when the emergency information is transmitted to mobile stations, by use of broadcast communication.

The invention claimed is:

1. A mobile communication system comprising a distribution server, a radio device, and a mobile station, wherein
   a key transmitter of the distribution server is configured to transmit a public key of the distribution server to the mobile station by use of a traffic channel for broadcast communication, wherein the traffic channel is a common traffic channel (CTCH) or a MBMS traffic channel (MTCH),
   a notification information transmitter of the radio device is configured to transmit notification information to the mobile station by use of either a paging indication channel (PICH) or a MBMS indication channel (MICH) for notifying a specific mobile station that there is incoming information,
   an electronic signature transmitter of the distribution server is configured to transmit and electronic signature to the notification information, to the mobile station, by use of the traffic channel for broadcast communication, and
   an authenticator of the mobile station is configured to authenticate the validity of the notification information based on the received electronic signature to the notification information and the public key of the distribution server.

2. The mobile communication method, comprising:
   transmitting a public key of a distribution server to a mobile station by use of a traffic channel for broadcast communication, wherein the traffic channel is a common traffic channel (CTCH) or a MBMS traffic channel (MTCH);
   transmitting notification information to the mobile station by use of either a paging indication channel (PICH) or MBMS indication channel (MICH) for notifying a specific mobile station that there is incoming information; and
   transmitting an electronic signature to the notification information, to the mobile station, by use of the traffic channel for broadcast communication, wherein
   authenticating, at the mobile station, the validity of the notification information based on the received electronic signature to the notification information and the public key of the distribution server.

3. A distribution server, comprising:
   a key transmitter configured to transmit a public key of the distribution server to a mobile station by use of a traffic channel for broadcast communication, wherein the traffic channel is a common traffic channel (CTCH) or a MBMS traffic channel (MTCH);
   a notification information transmitter configured to transmit notification information transmitted to the mobile station by use of either a paging indication channel (PICH) or a MBMS indication channel (MICH) for notifying a specific mobile station that there is incoming information; and
   an electronic signature transmitter configured to transmit an electronic signature to the notification information, to the mobile station, by use of the traffic channel for broadcast communication,
   wherein, the mobile station authenticates the validity of the notification information based on the received electronic signature to the notification information and the public key of the distribution server.

4. A radio network controller, comprising:
   a transmitter configured to transmit, to a mobile station receiving a public key of a distribution server by use of a traffic channel for broadcast communication, notification information received from the distribution server, by use of either a paging indication channel (PICH) or a MBMS indication channel (MICH) for notifying a specific mobile station that there is incoming information, wherein the traffic channel is a common traffic channel (CTCH) or a MBMS traffic channel (MTCH), and
   transmitting, to the mobile station, by use of the traffic channel, and electronic signature to the notification information,
   wherein, the mobile station authenticates the validity of the notification information based on the received electronic signature to the notification information and the public key of the distribution server.

5. A mobile station, comprising:
   a receiver configured to receive, by use of a traffic channel for broadcast communication, a public key of a distribution server, receiving, by use of either a paging indication channel (PICH) or a MBMS indication channel (MICH) for notifying the mobile station that there is incoming information, notification information, and receive, by use of the traffic channel for broadcast communication, an electronic signature to the notification information, wherein the traffic channel is a common traffic channel (CTCH) or a MBMS traffic channel (MTCH); and
   an authenticator configured to authenticate the validity of the notification information based on the received electronic signature to the notification information and the public key of the distribution server.

6. The mobile station according to claim 5, comprising a display controller configured to control, in reference to a result of the authentication, display method for the notification information.

7. The mobile station according to claim 6, wherein the display controller is configured to display information indicating that the notification information is false when the result of the authentication is negative, after displaying the notification information received.

8. The mobile station according to claim 6, wherein the display controller is configured not to display the notification information received when the result of the authentication is negative.

9. The mobile station according to claim 6, wherein the display controller is configured to initially display the notification information received before any authentication of the notification information has occurred.

* * * * *